United States Patent [19]

Van Laethem et al.

[11] Patent Number: 4,598,023
[45] Date of Patent: Jul. 1, 1986

[54] METHOD FOR FORMING A COATING ON A HOT VITREOUS SUBSTRATE BY SPRAYING THE SUBSTRATE WHILE HEATING THE ZONE THAT IS SPRAYED AND PRODUCT

[75] Inventors: Robert Van Laethem, Loverval; Albert Van Cauter, Charleroi; Robert Terneu, Thiméon, all of Belgium

[73] Assignee: Glaverbel, Brussels, Belgium

[21] Appl. No.: 610,086

[22] Filed: May 9, 1984

[30] Foreign Application Priority Data

May 13, 1983 [GB] United Kingdom ............... 8313285

[51] Int. Cl.$^4$ ..................... B32B 15/00; B32B 17/06
[52] U.S. Cl. ..................... 428/432; 65/60.5; 65/60.51; 427/55; 427/226; 427/314; 427/424; 427/427; 428/702
[58] Field of Search ............... 427/55, 126.2, 226, 427/69, 314, 427, 424, 168, 110; 65/60.1, 60.5, 60.51, 60.52, 60.53; 428/432, 689, 702

[56] References Cited

U.S. PATENT DOCUMENTS

| | | | |
|---|---|---|---|
| 3,689,304 | 9/1972 | Bamford | 427/226 |
| 3,850,665 | 11/1974 | Plumat et al. | 427/226 |
| 3,984,591 | 10/1976 | Plumat et al. | 427/110 |
| 4,144,362 | 3/1979 | Larkin | 427/226 |
| 4,240,816 | 12/1980 | McMaster et al. | 427/110 |
| 4,349,369 | 9/1982 | Van Laethem et al. | 427/110 |
| 4,349,371 | 9/1982 | Van Laethem et al. | 427/110 |
| 4,349,372 | 9/1982 | Van Laethem et al. | 427/110 |

Primary Examiner—Sadie L. Childs
Attorney, Agent, or Firm—Spencer & Frank

[57] ABSTRACT

A hot vitreous substrate 1 travels on a conveyor 2 through a coating station 5 where a metal compound is formed in situ on a face of the substrate 1 by pyrolytic decomposition of coating material 9 sprayed towards the substrate from a spray head 6 which repeatedly traverses the substrate path. Radiant heating means 11 located on the side of the substrate 1 being coated directs radiant heat towards the transverse region swept by the zone of impingement 10 of the coating precursor material 9 on the substrate 1.

22 Claims, 2 Drawing Figures

METHOD FOR FORMING A COATING ON A HOT VITREOUS SUBSTRATE BY SPRAYING THE SUBSTRATE WHILE HEATING THE ZONE THAT IS SPRAYED AND PRODUCT

BACKGROUND OF THE INVENTION

This invention relates to a method of forming a metal compound coating on a hot vitreous substrate as it is conveyed through a coating station in which coating precursor material is sprayed towards the substrate by means which repeatedly traverses the substrate path so that the coating precursor material decomposes pyrolytically and forms said coating in situ on said face, and to apparatus for performing such a method.

Many such processes are well known and are used inter alia for conferring radiation absorbing and/or reflecting properties on glass to be used for glazing purposes. It will be apparent that it is desirable for such coatings to be strongly adherent to the vitreous material and for them to have good optical properties. Such processes are also used to provide an electrically conductive coating for various purposes.

SUMMARY OF THE INVENTION

It is an object of the present invention to provide a method which allows formation of such a coating which is more uniform in structure than has hitherto been possible.

According to the present invention there is provided a method of forming a metal compound coating on a hot vitreous substrate as it is conveyed through a coating station in which coating precursor material is sprayed towards the substrate by means which repeatedly traverses the substrate path so that the coating precursor material decomposes pyrolytically and forms said coating in situ on said substrate, characterised in that radiant heat from radiant heating means located on the side of the substrate being coated is directed towards the transverse region swept by the zone of impingement of the coating precursor material on the substrate.

A method according to the invention permits the formation of a coating which is more uniform than has hitherto been possible, and which is also more efficient in use of coating precursor material.

In the absence of such heating there would be a drop in the temperature of the hot substrate over the length of the transverse region swept by the impingement zone of the coating material. This temperature drop may be due to one or more causes, e.g. heating and evaporation of any solvent used for spraying the coating material, heating the coating precursor material itself, or absorption of heat by any endothermic coating reaction which takes place. In the absence of any said heating, the thermal energy required for one or more of these purposes would have come from the substrate. The coating reactions which take place proceed at a rate which is temperature dependent. In an example of a prior art method, a 950 nm thick coating of tin oxide has been deposited on a hot glass ribbon by spraying an aqueous solution of tin dichloride, the rate of traverse of the spray, the length of the spray impingement zone and the speed of advance of the ribbon being such that each increment of area of the ribbon was traversed seven times by the spray impingement zone to build up the coating. It was found that the thickness of the coating which was attributable to the first passage of the spray impingement zone was 180 nm, while that due to the last traverse was barely 100 nm thick despite a constant spraying rate. Also there was a temperature drop on the surface being coated of between 30° C. and 40° C. as a result of coating. It was further calculated that less than 10 percent of the tin sprayed was incorporated in the coating.

Thus in the absence of heating in accordance with the present invention, the rate at which the coating reactions take place slows down as the coating increases in thickness, and an increasing proportion of the coating precursor material will not be converted to form the required coating.

Heating the substrate from above during its coating provides energy to evaporate the solvent sprayed and to reduce the temperature drop in the surface of the substrate over the coating period, so that the rate at which the coating reactions take place is not reduced, or is not reduced to so great a degree, and so that the coating yield is also favourably affected. By acting in this way it would in theory be possible to make a saving of up to 25 percent in the amount of coating precursor materials applied. Building up the coating as result of reactions which proceed at a more nearly uniform rate is beneficial for the optical and other properties of the coating applied.

A further important advantage is also achieved when the substrate is heated from above in this way. Such heating entails that the temperature in the atmosphere above the substrate is higher than it would be in the absence of such heating with the result that the solvent and coating precursor are less likely to condense within the coating station, for example on aspirators located at the downstream end of the coating station and used for exhausting waste materials. Thus the risk of condensation droplets falling onto the freshly formed coating to stain it is also reduced.

Preferably, said coating precursor material is sprayed obliquely towards the path of the substrate in a direction leading along that path. Such an arrangement tends to give a longer spray impingement zone and to make it more easy to direct radiant heat to that zone than when spraying normally to the substrate.

Advantageously, said coating precursor material is sprayed obliquely towards the path of the substrate in the downstream direction along it.

Advantageously, said radiant heating means has a black body temperature in the range 900° C. to 1600° C. inclusive. Radiation of wavelengths emitted by such a radiator is strongly absorbed by the coated vitreous material.

In this way the heating action is confined entirely, or substantially entirely, to a superficial layer of the vitreous material of the coated face. This selective heating of one face of the substrate has been found to give advantages in annealing the substrate subsequent to its coating when switching production from coated to non-coated glass and vice versa, and is especially valuable when the substrate is constituted by a ribbon of freshly formed glass.

When annealing a ribbon having a significant temperature gradient in its thickness when leaving the coating zone, the cooling schedule following the coating step must be appropriately set to allow for that temperature gradient if the annealing is to proceed in an entirely satisfactory manner. If, in a production plant in which the ribbon is heated throughout its thickness prior to or during coating, it is desired at any time to switch to the production of uncoated glass it is therefore not sufficient to render the heating and coating apparatus inactive. Adjustment of the annealing installation is also required and that adjustment is very time consuming. Similarly, such adjustment is also required when switching back to the production of coated glass and it may even be required when switching from one type or thickness of coating to another since this often implies a change in the amount of heat absorbed from the surface of the ribbon during coating. A process adopting this preferred feature of the present invention can be performed so that no, or only very minor, adjustment of annealing conditions is required even when switching production from coated to uncoated glass and vice versa. Preferably, a plurality of heaters is disposed along the path of the substrate. This is particularly beneficial in allowing adjustments of heating along the length of the spray impingement zone.

Advantageously, the intensity of radiation directed towards the transverse impingement region is controlled by adjusting the height of the radiant heaters above the substrate path. This is a very simple way of controlling the heating of the substrate. Alternatively or in addition, such control can be effected by varying the supply of fuel or heating current to the radiant heating means.

In preferred embodiments of the invention, the heating is controlled so that for any increment of the area of the substrate the temperature of the surface being coated varies, if at all, by less than 15° C. between the time when such incremental area is first coincident with the zone of impingement of the coating precursor material and the time when it is last coincident with that zone and preferably such temperature so varies by less than 10° C. This promotes uniformity of reaction rates during the period of which the coating is formed.

Advantageously, a plurality of heaters is disposed across the path of the substrate whereby the quantities of heat directed towards different width increments of the substance are independently adjustable. It is known that marginal portions of a heated substrate tend to lose heat more rapidly than does the centre, so that the adoption of this preferred feature allows regularisation of the temperature of the substrate across its width so that in turn uniformity of the coating across the width of the substrate is promoted. To this end, it is in particular preferred that the heating is so controlled that, for any increment of the length of the substrate, the temperature of the surface to be coated varies, if at all, by less than 15° C. across the substrate width during coating.

The invention also provides apparatus for forming a metal compound coating on a hot vitreous substrate comprising a conveyor for conveying the substrate to be coated along a path through a coating station provided with coating means which repeatedly traverses the substrate path to spray coating precursor material so that the coating precursor material decomposes pyrolytically and forms said coating in situ on said substrate, characterised in that radiant heating means is provided on the same side of the substrate path as the coating means, such heating means being arranged and disposed so as to direct radiant heat towards the transverse region swept by the zone where sprayed coating material impinges of the substrate path.

Such apparatus preferably incorporates one or more of the following optional features:

(i) said coating means is arranged to spray said coating material obliquely towards the substrate path and in a direction leading along that path;
(ii) said coating means is arranged to spray said coating material obliquely towards the substrate path in the downstream direction along it;
(iii) said heating means comprises a plurality of heaters disposed along the path of the substrate;
(iv) said heating means is adjustable in height above the substrate path; and
(v) said heating means comprises a plurality of independently adjustable heaters disposed across the substrate path.

DESCRIPTION OF THE PREFERRED EMBODIMENT

Figure 1:
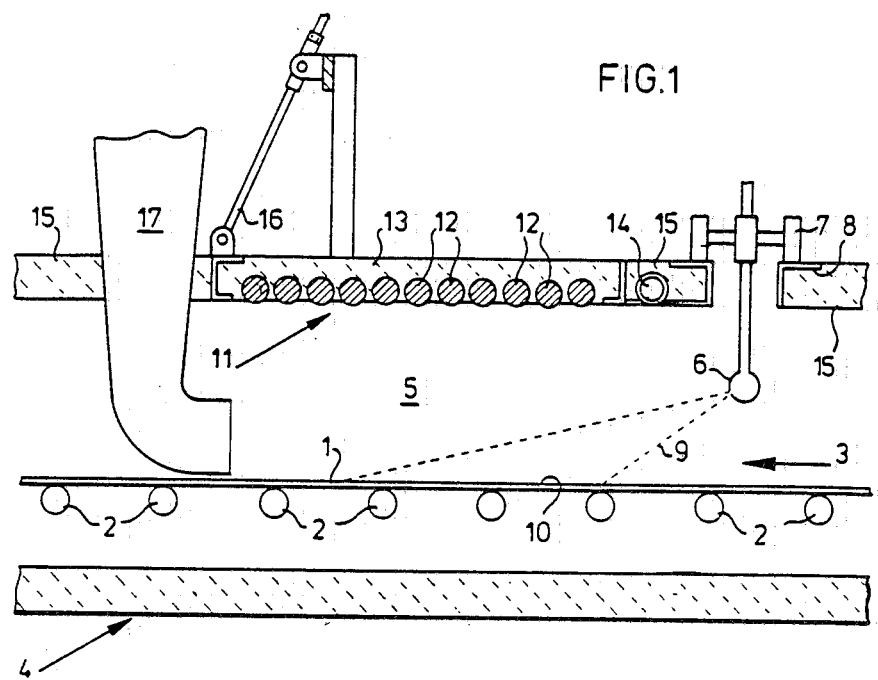
FIGS. 1 and 2 are cross-sections through two embodiments of apparatus for performing the present invention.

In FIG. 1, a hot vitreous substrate is conveyed along a path 1 by conveyor rolls 2 in a downstream direction 3 along a tunnel 4 containing a coating station 5.

In the coating zone, a spray head 6 is mounted on a carriage 7 running on a track 8 so that it can repeatedly traverse the path 1 of the hot glass substrate spraying a cone 9 of coating precursor material obliquely towards the substrate in the downstream direction 3 along the substrate path 1 so that it impinges against the substrate in a zone 10 which sweeps across the substrate path 1 to define a transverse impingement region. In accordance with the invention, radiant heat is directed towards that region of impingement from radiant heating means 11 located on the same side of the substrate path 1 as the spray head 6.

In the apparatus shown in FIG. 1, the heating means 11 comprises a plurality of heating elements 12 leading across the path 1 of the substrate and disposed along that path, the elements 12 being carried by a refractory support 13 which is hinged at 14 to the roof wall 15 of the tunnel 4 so that it can be raised and lowered by means of screwthreaded struts such as 16 with the hinge 14 as pivot in order to vary the intensity of heat directed towards a substrate travelling along the path 1.

An exhaust duct 17 is provided for scavenging coating reaction by-products and unused precursor material.

The heating elements 12 act to supply heat to the surface of the substrate to be coated and to the atmosphere above it, thus providing additional heat for the evaporation of carrier solvent in the coating precursor material sprayed and for the coating reaction to take place. The radiant heat is thus directed towards the impingement zone 10 of the spray cone 9 on the substrate, and it is also directed towards the spray cone 9 before such impingement and to the substrate downstream of the impingement zone 10 where the reaction proceeds on the coated surface.

The heating effect of the heaters 12 can be and preferably is controlled so that the temperature of each increment of area of the coated surface of the substrate is maintained as nearly constant as possible during the coating so that coating precursor material deposited by successive passes of the spray head 6 is applied under as nearly as possible identical temperature conditions so that the coating reactions proceed at a uniform rate throughout the coating period.

The use of the heating means 11 also heats up the coating station itself and thus inhibits condensation of coating precursor material, for example on the roof wall 15 or exhaust duct 17. As a result of this there is must reduced risk that any such condensation droplets should fall onto the upper surface of the glass to mar the coating.

In a preferred optional arrangement, the heating elements 12 are not continuous over the width of the substrate path, but rather comprise a plurality of sections so that different width increments of the substrate path 1 can be heated differentially. With such an arrangement it is possible to compensate for heat losses through or to the side walls of the tunnel 4.

The embodiment of the invention illustrated in FIG. 1 is specifically intended for use in coating sheets of glass.

EXAMPLE 1

In a specific example, glass sheets are conveyed along the path 1 at a speed of 60 cm/min for coating with a fluorine-doped $SnO_2$ coating 250 nm thick by spraying with a solution in dimethylformamide of $SnCl_4.5H_2O$ and trifluoroacetic acid. The spray head 6 is located 15 cm above the glass and is arranged to traverse to and fro across the glass at 16 cycles/minute for spraying the coating precursor material at 30° to the horizontal. The heating elements 12 commence some 20 cm downstream of the sprayhead 6 and extend over a tunnel roof section length of some 60 cm. The refractory support 13 forming such tunnel roof section is pivoted down so that the upstream heating element is 25 cm above the substrate path and the downstream heating element is 10 cm above that path. The heating elements are adjustable between 900° C. and 1600° C. in their black body temperature, and have an adjustable power output up to a maximum of between 60 and 100 KW. The heaters are adjusted to maintain the temperature in the atmosphere above the path at 460° C., while the glass enters the coating station at a temperature of 580° C.

Such a process results in a coating having a highly uniform structure and which is substantially free from defects due to the dripping of condensation droplets.

Figure 2:
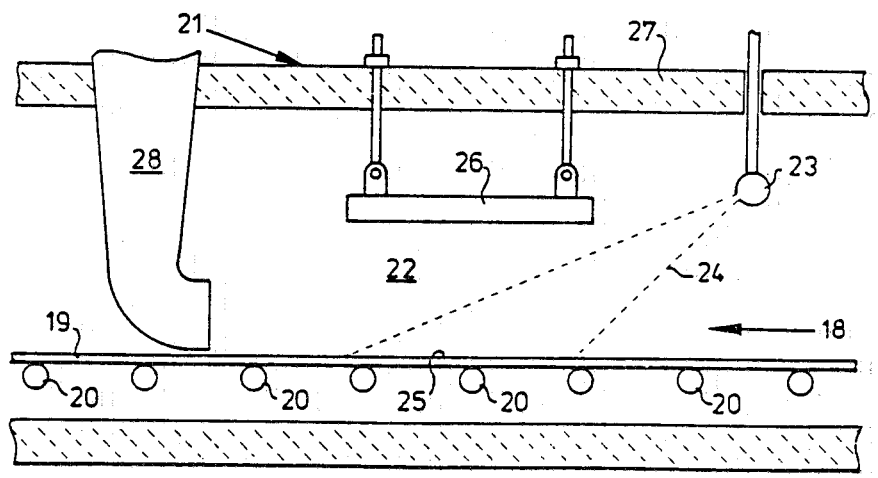

FIG. 2 illustrates an alternative embodiment of the invention in which a freshly formed ribbon of hot glass is conveyed in a downstream direction 18 along a path 19 by conveyor rolls 20 through a tunnel 21 located between a ribbon forming machine such as float tank (not shown) and a horizontal annealing lehr (not shown). The tunnel 21 includes a coating station 22 provided with a sprayhead 23 arranged repeatedly to traverse the path 19 of the hot glass ribbon spraying a cone 24 of coating precursor material obliquely towards the substrate path in the downstream direction 18 so that material impinges against the substrate in a zone 25 which sweeps across the path to define a transverse impingement region. Radiant heat is directed downwards onto that impingement region from radiant heating means 26 which is suspended from the roof 27 of the tunnel 21 in such a way that its height above the substrate path is variable. The heating means is arranged in a plurality of sections which are controllable so as to enable variation in heat output along the length of the tunnel 21 and across its width.

An exhaust duct 28 is provided for aspirating reaction by-products and unused precursor material.

The heating means 26 optimally has a black body temperature in the range of 900° C. to 1600° C. so that the radiation emitted thereby will not penetrate beyond a layer of the substrate at the surface to be coated. In this way heating of the substrate can be controlled so that additional heat imparted balances the heat absorbed from the substrate by the coating reactions so that the substrate has substantially the same temperature gradient in its thickness before and after coating. This is especially important when the substrate is a continuous ribbon of freshly formed glass which is coated between a glass forming machine, for example a float tank, and an annealing lehr (not shown). The adoption of this feature enables production to be switched from coated to uncoated glass without disturbing the temperature gradient through the thickness of the glass ribbon. This means that the same annealing conditions can obtain in the annealing lehr for coated and uncoated glass so that the switches in production can be made much more rapidly. Again, the use of heating means inhibits condensation of the coating precursor material do that the risk of droplets of that material dripping onto the glass is reduced.

EXAMPLE 2

In a specific example, a freshly formed ribbon of flat glass enters the coating station at a temperature of 600° C. and a speed of 4.5 m/min. An aqueous solution of $SnCl_2$ and $NH_4F.HF$ is sprayed in a cone whose axis is at 30° to the horizontal and which impinges against the ribbon over a transverse impingement region 85 cm long from a sprayhead located 60 cm above the ribbon and which traverses the ribbon path at 25 cycles/minute in order to form a coating 750 nm thick of fluorine-doped $SnO_2$. The heating means 26 is located 50 cm above the ribbon path and is adjustable in height down to 20 cm above that path. The heating means occupies a tunnel length of 90 cm, its downstream end being located vertically above the downstream end of the transverse impingement region of the spray cone 24 on the glass ribbon. The heating means comprises a plurality of independently adjustable gas burners along and across the tunnel 21. The gas burners have a black body temperature adjustable over the range 900° C. to 1600° C.

The atmosphere above the ribbon on the spraying zone is maintained at about 450° C. so that tin chloride which is not used in the coating reaction has a high vapour pressure and is aspirated. As a result any risk of the tin chloride condensing in the tunnel 21, for example on the exhaust duct 28, and falling onto the ribbon to stain the freshly formed coating, is substantially eliminated.

It was found that the coating formed had a substantially uniform structure throughout its thickness.

What we claim is:

1. A method of forming a metal compound coating on a side of a hot vitreous substrate as it is conveyed along a substrate path through a coating station, comprising the steps of: (a) spraying coating precursor material towards the substrate by means which repeatedly traverses the substrate path, said coating precursor material being deposited on said substrate at a zone of impingement which sweeps transverse regions of the substrate and decomposing pyrolytically to form said coating in situ on said substrate; and (b) directing radiant heat from radiant heating means located on the side of the substrate being coated towards the transverse region swept by the zone of impingement of the coating precursor material on the substrate.

2. A method according to claim 1, wherein step (a) is conducted by spraying said coating precursor material obliquely towards the path of the substrate in a direction leading along the path.

3. A method according to claim 1, wherein said substrate is conveyed in a downstream direction along said substrate path, and wherein step (a) is conducted by spraying said coating precursor material obliquely towards the path of the substrate in a direction leading along the path and in the downstream direction.

4. A method according to claim 1, wherein step (b) is conducted by directing radiant heat from radiant heating means having a black body temperature in the range 900° C. to 1,600° C. inclusive.

5. A method according to claim 1, wherein step (b) is conducted by directing radiant heat from radiant heating means which includes a plurality of heaters disposed along the path of the substrate.

6. A method according to claim 1, further comprising controlling the intensity of radiation directed towards the transverse region swept by the zone of impingement by adjusting the height of the radiant heating means above the substrate path.

7. A method according to claim 1, further comprising controlling the radiant heat so that for any increment of the area of the substrate the temperature of the surface being coated varies, if at all, by less than 15° C. between the time when such incremental area is first coincident with the zone of impingement of the coating precursor material and the time when it is last coincident with that zone.

8. A method according to claim 7, wherein such temperature so varies by less than 10° C.

9. A method according to claim 1, wherein step (b) is conducted by directing radiant heat from radiant heating means which includes a plurality of heaters disposed across the path of the substrate whereby the quantities of heat directed towards different width increments of the substrate are independently adjustable.

10. A method according to claim 9, further comprising controlling the radiant heat so that, for any increment of the length of the substrate, the temperature of the surface to be coated varies, if at all, by less than 15° C. across the substrate width during coating.

11. Vitreous material coated by a method according to claim 1.

12. A method of forming a metal compound coating on a hot vitreous substrate as the substrate moves along a substrate path through a coating station, comprising the steps of:
 (a) spraying said substrate with a coating precursor material which pyrolytically decomposes to form said coating in situ on said substrate, said coating precursor material being deposited on said substrate at a zone of impingement which sweeps transverse to said path; and
 (b) directing radiant heat, from radiant heating means mounted at said station, toward said zone of impingement as said coating precursor material is being deposited at said zone of impingement.

13. A method according to claim 12, wherein step (a) is conducted by directing the spray obliquely toward said path and in a direction leading along said path.

14. A method according to claim 12, wherein said substrate moves along said path in a downstream direction, and wherein step (a) is conducted by directing the spray obliquely toward said path and in said downstream direction.

15. A method according to claim 12, wherein step (b) is conducted by directing radiant heat from a radiant heating means having a black body temperature ranging from 900° C. to 1,600° C. inclusive.

16. A method according to claim 12, wherein step (b) is conducted by directing radiant heat from radiant heating means which includes a plurality of heaters disposed along said path.

17. A method according to claim 12, further comprising the step of controlling the intensity of the radiation directed toward said zone of impingement by adjusting the distance between said radiant heating means and said substrate.

18. A method according to claim 12, further comprising the step of controlling the intensity of the radiation directed toward said zone of impingement so that for any incremental area at the surface of the substrate which is being coated, the temperature varies by less than 15° C. between the time when said incremental area is first coincident with said zone of impingement and the time when said incremental area is last coincident.

19. A method according to claim 18, wherein the temperature varies by less than 10° C. between the time when said incremental area is first coincident with said zone of impingement and the time when said incremental area is last coincident.

20. A method according to claim 12, wherein step (b) is conducted by directing heat from radiant heating means which includes a plurality of heaters disposed across said path so that the quantities of heat directed toward different width increments of said substrate are independently adjustable.

21. A method according to claim 20, further comprising controlling the radiant heat so that, for any increment of the length of the substrate, the temperature of the surface being coated varies by less than 15° C. across the substrate width during coating.

22. A vitreous material coated by a method according to claim 12.

* * * * *